United States Patent [19]

Israelsohn et al.

[11] Patent Number: 4,953,536

[45] Date of Patent: Sep. 4, 1990

[54] WATER HEATING APPARATUS

[76] Inventors: Cedric Israelsohn, 351 Huntingdale Rd., Oakleigh South Victoria, Australia, 3167; Andrew J. Read, 683 Pretoria Main Road, Wynberg, Sandton, South Africa, 2090

[21] Appl. No.: 216,114

[22] Filed: Jul. 7, 1988

[51] Int. Cl.[5] .............................................. A47J 27/00
[52] U.S. Cl. ..................................... 126/374; 219/292; 237/2 R
[58] Field of Search ............... 126/419, 422, 423, 432; 219/285, 281, 282, 284; 237/2 R

[56] References Cited

U.S. PATENT DOCUMENTS

| | | | |
|---|---|---|---|
| 4,261,333 | 4/1981 | Guarnschelli | 126/427 |
| 4,284,062 | 8/1981 | Swindle | 126/419 X |
| 4,368,549 | 1/1983 | Ramey | 126/419 X |
| 4,494,526 | 1/1985 | Wurst et al. | 126/419 |
| 4,718,403 | 1/1988 | McCall | 126/419 X |

*Primary Examiner*—Larry Jones
*Attorney, Agent, or Firm*—Sheldon & Mak

[57] ABSTRACT

Water heating apparatus by flow of electric current through the water from a set, for example, of eight electrodes whose surface areas for current flow are proportional to the value of two raised to the eight exponents zero to seven, that is 1 to 128. This gives an area range of 1:256 which can be switched in binary digital manner automatically by solid state circuitry in response to a temperature window, electric current flow or other indicators. This gives automatic compensation for wide water conductivity ranges and flow rates without any moving parts to give a practical mass-produced industrial or domestic water heater.

10 Claims, 3 Drawing Sheets

WATER HEATING APPARATUS

BACKGROUND

1. Field of the Invention

This invention concerns improvements in and relating to water heating apparatus for use in any type of application, domestic, industrial or other. More particularly the invention is concerned with such apparatus which uses the medium of the water for the heating effect of the electric current, for example, by means of uninsulated electrodes immersed in the water.

2. Prior Art

A large amount of water heating is done by means of thermostat controlled electric heating of the water in a drum, certainly in domestic applications a vast majority of cases. This allows the water to be heated slowly by a relatively low capacity heater and stored at the required temperature in the drum from which it can be drawn from time to time. The serious disadvantage is very poor efficiency of this system due to heat loss from the drum since the water is held at a high temperature largely continuously. Despite this disadvantage this system is adopted widely probably because it is technically simple and inexpensive and the electrical power demand is relatively low albeit for long periods.

Demand water heaters are in use on a smaller scale where the elements heat only when a flow of water through the apparatus is initiated requiring relatively high electrical power supply levels if a strong flow of very hot water is to be supplied. The performance of such heaters is moreover vitally affected by the conductivity of the water which varies to a remarkable degree from place to place and from time to time. So much so that fixed design demand heaters are likely to give unsatisfactory performance in many instances. Reference is made to Table A which shows the extreme range, for example, from as low as 1 millisiemes at a Swartruggens minimum to 993 millisiemens at a Britstown maximum. The table shows that not only is the range extreme from place to place but also in many individual places.

Table B shows that categorising results on a regional basis does not introduce any uniformity which would permit supplying apparatus specially adapted to suit each region.

Some designs have been proposed which include electrodes moveable in respect of the water to allow adjustment to compensate for variations in conductivity. It would seem that these designs, however, have not been successful probably because of high cost and low reliability as well as the difficulty that the average user especially, for example, in the domestic context cannot be relied on to make suitable adjustments especially when the conductivity of water in a single area swings between wide limits as Table A shows. Automated controls for servo motor actuated adjustment have not been seriously proposed certainly not in the domestic context, for example.

The "Electrical Engineer's Handbook" 1973 Ed., publ. Butterworth, at page 14-55 says: ". . . variation in water resistivity (which can be allowed for in large installations) makes mass production for domestic use very difficult." The "Electrical Engineer's Reference Book" publ. G. Newnes Ltd., at page 15-24 says: ". . . the great variation that one may expect in the resistivity of water supplies which while it can be easily allowed for in designing specific high-loading installations, presents an almost insuperable difficulty to mass productions for general domestic use." No solution for these problems is offered.

TABLE A

| | | Min. | Max. | Av. Mean | Median |
|---|---|---|---|---|---|
| 1541 | Kommando Drift, EP | 10,9 | 85,9 | 55,3 | 33 |
| 1620 | King Williams Town, EP | 25,0 | 83,6 | 52 | 50 |
| 1730 | Queenstown, EP | 2 | 26 | 10 | 8 |
| 1850 | Umzinkulu, Natal | 22 | 46 | 32 | 38 |
| 1920 | Pmburg, Natal | 5 | 20 | 7 | 7 |
| 1182 | Uniondale, SW Cape | 14 | 58 | 22 | 18 |
| 1210 | Uitenhage, EP | 15 | 23 | 19 | 20 |
| 1323 | Waterford, EP | 5 | 550 | 158 | 154 |
| 1430 | Grahamstown, EP | 43 | 136 | 90 | 100 |
| 1513 | Stennsburg, EP | 21 | 81 | 32 | 23 |
| 0911 | Laingsburg, Karoo | 35 | 130 | 70 | 65 |
| 0925 | Calitzdorp, Karoo | 9 | 53 | 30 | 42 |
| 1010 | Mossel Bay, SW Cape | 72 | 227 | 139 | 176 |
| 1090 | Humansdorp, EP | 18 | 28 | 23 | 24 |
| 1130 | Willowmore, EP | 25 | 850 | 298 | 273 |
| 2010 | Bergville, Natal | 4 | 17 | 8 | 7 |
| 2030 | Newcastle, Natalo | 7 | 39 | 17 | 13 |
| 2113 | Eshowe, Natal | 15 | 26 | 20 | 22 |
| 2144 | Pongola, Natal | 6 | 114 | 40 | 95 |
| 2154 | Ermelo, E. Tvl | 4 | 10 | 5 | 4 |
| 0121 | Pretoria, Tvl | 15 | 69 | 45 | 52 |
| 0130 | Swaartruggers | 1 | 49 | 19 | 9 |
| 0140 | Nylstroom, N. Tvl | 5 | 8 | 6 | 5 |
| 0150 | Potgietersrus, N. Tvl | 3 | 37 | 11 | 15 |
| 0160 | Pietersrburg, N. Tvl | 5 | 21 | 8 | 7 |
| 0180 | Louis Trichardt, N. Tvl | 10 | 44 | 22 | 15 |
| 0190 | Parfuri, N. Tvl | 5 | 55 | 21 | 17 |
| 0232 | Groblersdaal, N. Tvl | 6 | 38 | 21 | 16 |
| 0280 | Duiwelskloof, N. Tvl | 3 | 13 | 5 | 6 |
| 0312 | Villiers, OFS | 10 | 31 | 18 | 15 |
| 0390 | Christiana, Tvl | 11 | 127 | 52 | 77 |
| 0323 | Potchefstroom, Tvl | 17 | 79 | 51 | 59 |
| 0352 | Bloemfontein, OFS | 16 | 52 | 29 | 37 |
| 0420 | Weppenaar, OFS | 10 | 38 | 19 | 23 |
| 0434 | Colesburg, Karoo | 10 | 28 | 16 | 17 |
| 0460 | Britstown, Cape | 58 | 993 | 352 | 329 |
| 0510 | ClanWilliam, W. Cape | 1 | 14 | 8 | 9 |
| 0710 | Malmsbury, W. Cape | 2 | 52 | 13 | 11 |
| 0740 | Caledon, W. Cape | 8 | 12 | 9 | 9 |
| 0810 | Worcester, W. Cape | 4 | 15 | 7 | 6 |
| 0840 | Robertson, W. Cape | 6 | 17 | 10 | 7 |
| | Jhb. | | | | 35 |
| | Read's borehole | | | | 17 |
| | Lowest | 1 | 8 | 5 | 4 |
| | Highest | 58 | 993 | 352 | 329 |

TABLE B

| E.P. | Natal | S.W. Cape | Karoo | E. Tvl. | N. Tvl. | W. Tvl. | OFS | N. Cape | W. Cape |
|---|---|---|---|---|---|---|---|---|---|
| 33 | 38 | 18 | 65 | 4 | 52 | 9 | 15 | 329 | 9 |
| 50 | 7 | 176 | 42 | 16 | 5 | 77 | 37 | | 11 |
| 8 | 7 | | 17 | | 15 | 59 | 23 | | 6 |
| | 13 | | | | | | | | 7 |
| 20 | 22 | | | | 7 | | | | |
| 154 | 95 | | | | 15 | | | | |
| 100 | | | | | 17 | | | | |

TABLE B-continued

|  | E.P. | Natal | S.W. Cape | Karoo | E. Tvl. | N. Tvl. | W. Tvl. | OFS | N. Cape | W. Cape |
|---|---|---|---|---|---|---|---|---|---|---|
|  | 23 |  |  |  |  | 6 |  |  |  |  |
|  | 24 |  |  |  |  |  |  |  |  |  |
|  | 273 |  |  |  |  |  |  |  |  |  |
| Av. | 46 | 76 | 30 | 97 | 41 | 10 | 16 | 48 | 24 | 109 | 8 |
| High | 273 | 95 | 176 | 65 | 16 | 52 | 77 | 37 | 329 | 11 |
| Low | 8 | 7 | 18 | 17 | 4 | 5 | 9 | 15 | — | 6 |

It is an object of this invention to provide water heating means by the heating effect of electric current flow in the water which is capable of compensating for wide water conductivity ranges, for example of the extent indicated above.

It is a further object to do this in a practical solution, thus without moving parts which can be subject to wear, sticking or other unreliability or poor durability.

SUMMARY OF THE INVENTION

A water heating apparatus in accordance with this invention comprises a plurality of electrodes immersed in water to be heated, a detection device adapted to detect a characteristic which gives a measure of the heating effect and switching means adapted to switch in a selection of the heating elements in response to the detected characteristic.

Preferably the plurality of heating elements are of different sizes one from another so that different selections of the elements can provide a full choice of different heating effects over the full range required. For example, the combination of the elements can vary substantially in accordance with a binary sequence involving multiple bits. Such a sequence can allow for the selection of any total heating effect with unit steps. For example, one could provide a range of over 256:1 in as many steps up to 256 as are desired. This can accommodate substantially the extreme range of conductivities which have been detected in waters as shown in Table A. The binary system is chosen because it can be executed directly in a digital control circuitry whether the elements are switched on or off to provide the binary sequence. The response to the detected characteristic will thus be to control the switching of the elements in a required manner.

The detected characteristic is preferably the output temperature of the water from the apparatus thus a "window" of output temperatures, for example, a range say between 60° C. and 70° C. or, for example 45° C. to 50° C. for a practical bathing temperature is specified for control of the response. When the temperature is detected to exceed this range the response is to reduce the total value of the elements switched in and conversely.

Alternatively the detected characteristic may be the total heating current, however, preferably this characteristic is used to influence the response only to control an upper limit of heating current, for example, such as will be convenient in any particular electrical installation such as, for example, 40 amps in a multiple or single phase application. Thus the system will be inhibited from delivering more than 40 amps even if the output temperature falls below the defined window. Making the response dependant only on the detected heating current is not preferred because at very low liquid flow rates of the demand type system and in a heating tank type system this could lead to boiling of the water at the elements.

The invention is preferably applied in the context of a demand heater where the heating elements switch on only when water flow through the apparatus commences.

Where the plurality of heating elements are of different sizes, for example, according to the bit values of a multiple binary number system the larger elements may be sub-divided into sub elements electrically connected in parallel to facilitate convenient overall dimensions for the apparatus.

Preferably the switching in of the heating elements is executed by a suitable solid state circuitry and it will thus be appreciated that the apparatus has the advantage of fixed structure with no moving parts. Nevertheless exhibiting the extreme flexibility necessary to cope with the conductivity ranges described and with wide variations in flow rates through the apparatus in the case of a demand heating application.

Preferably the lay out of heating elements which are immersed in the water is adapted to provide for water flow past all areas of the electrodes so as to avoid local overheating and preferably earth screens are used at the inlets and outlets to the apparatus for protection against earth leakages and/or neutral connection failures.

BRIEF DESCRIPTION OF THE DRAWINGS

The invention will be more fully described by way of an example with reference to the accompanying drawings in which.

DESCRIPTION OF THE PREFERRED EMBODIMENTS

Figure 1:
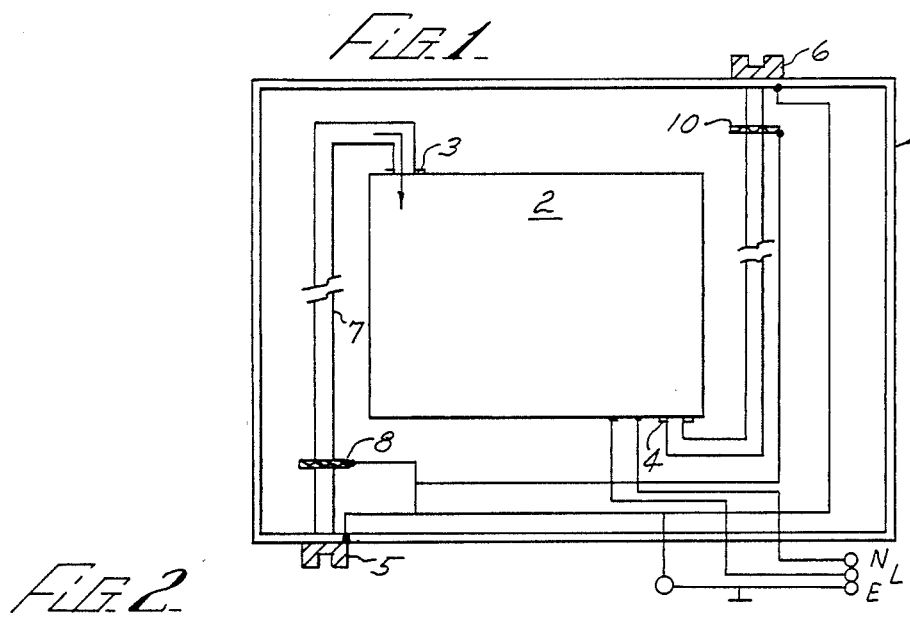
FIG. 1 is a schematic general arrangement of the apparatus.

As shown in FIG. 1 the apparatus 1 comprises a heating unit 2 having a water inlet 3 and an outlet 4 both connected by about 1 meter of electrically non-conductive conduit, e.g. rubber hose to allow for earth leakage safety protection to the external water supply at inlet coupling 5 and outlet coupling 6. The inlet stretch of rubber hose 7 has an earth screen 8 and the outlet stretch of rubber hose 9 has a earth screen 10. The earth (E) conductors are connected to both external couplings 5 and 6, or the piping that both inlet and outlet 3 and 4 are connected to should be piping of metal (electrically conductive) construction, the neutral (N) conductors are connected to the neutral heating electrodes inside the unit 2 and the live (L) conductors to the live heating electrodes inside the unit 2. This is designed to provide protection against earth leakages and neutral connection failure. If the neutral disconnects then even in the case of high water conductivities the end user is still preserved at electrical earth potential or an earth leakage protection unit in the supply will trip. If the earth is working and no trip occurs then, of course, any current present is insufficient to be hazardous. If the earth leakage is not working and the neutral is disconnected then the end user is still at electrical earth and thus not exposed. The earth screens are in between electrified water and the electrically earthed external couplings 5 and 6. In addition a sufficient, e.g. around 1 meter length of rubber hose between the heating unit 2 and the neutral screens provide protection.

Figure 2:
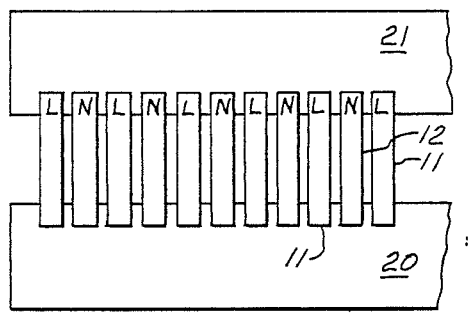
FIG. 2 is a schematic elevation of the interior showing the heating elements of the apparatus between top and bottom panels.
Figure 3:
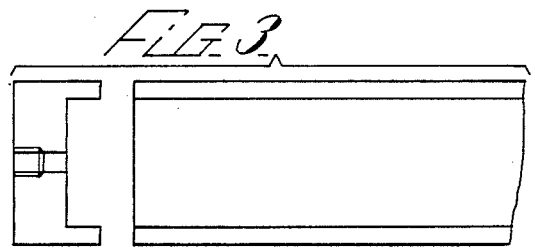
FIG. 3 shows elevation of a side closure wall.
Figure 4:
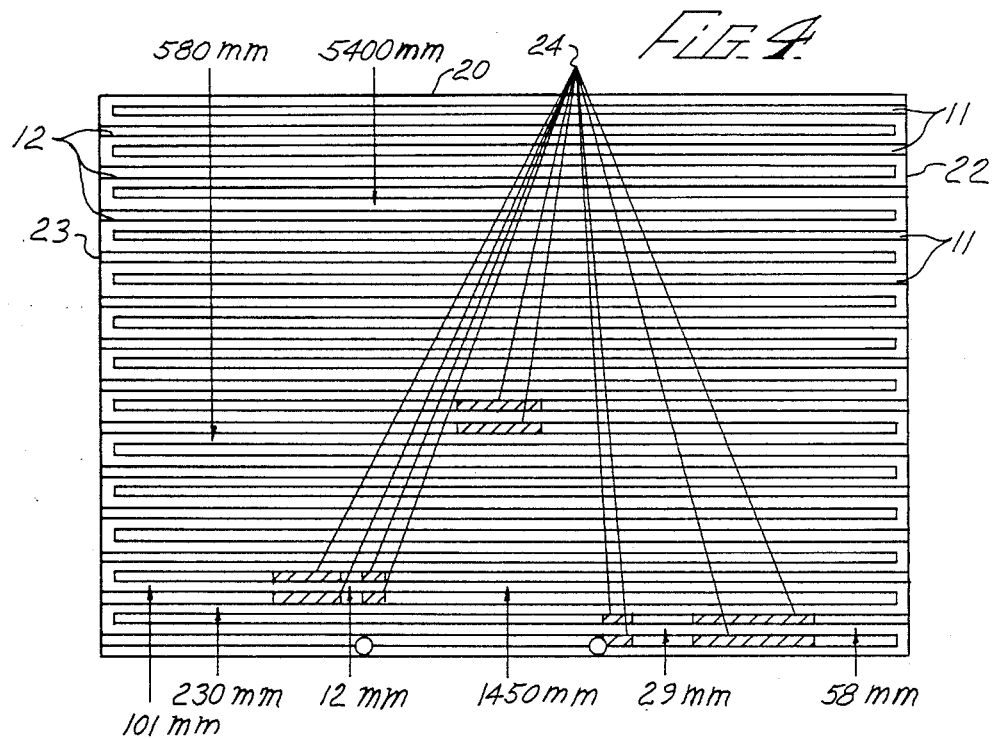
FIG. 4 is a plan view of the heating element arrangement, that is a schematic view of the electrodes.

FIGS. 2 to 4 show the layout of the heating electrodes within the heating unit 2. The unit 2 is a flat box and all the electrodes 11, 12 are mounted in sealing contact between the base 20 and lid 21 of the box. The live electrodes 11 are sealed to the right hand wall 22 of the box but terminate short of the left hand wall 23 while all of the neutral electrodes 12 are closed to the left hand wall 23 of the box and terminate short of the right hand wall 22. This defines a zig zag path for the water to follow through the unit being heated by the electrical current which flows through it from the live electrodes 11 to the neutral electrodes 12 as it passes down the passages. Non-conductive inserts 24 are provided. The electrode lengths are shown, and reference is made to table C. The water then exits from the exit 4. These conductors all have the same height so that their effective conducting areas are determined by their lengths and these lengths correspond to the bit values of the, for example 8 bit, binary code. It is this automated variation of total "conductive area" exposed to the water for electric current flow, controlled by digital electronics or other state-of-the-art solid state switching means, that allows for the variance in the conductivity of the water.

The electrodes shown represent in some cases sub elements of the multiple heating elements which can be switched in in any required combination. Table C indicates an example of the relationships in an 8 bit binary system.

TABLE C

| Binary Digit Significance | Length of electrode element | Arrangement of sub elements | Bit value |
| --- | --- | --- | --- |
| 7 | 5400 mm | 10 × 540 mm | 128 |
| 6 | 1450 mm | 5 × 290 mm | 64 |
| 5 | 580 mm | 4 × 145 mm | 32 |
| 4 | 230 mm | 2 × 115 mm | 16 |
| 3 | 101 mm | 1 × 101 mm | 8 |
| 2 | 58 mm | 1 × 58 mm | 4 |
| 1 | 29 mm | 1 × 29 mm | 2 |
| 0 | 12 mm | 1 × 12 mm | 1 |

As will be seen the 8 elements provide in effect 8 binary bits of an 8 bit byte for a binary digital electronic control system. The column under "Bit value" shows that from the 8 digits a total of 256 steps are possible. The column under "length" shows the effective total length of the electrodes corresponding to each bit and the column under "arrangement" shows how the longer electrodes are sub divided into sub elements in the manner indicated. Reference to FIG. 2 in comparison with Table C will show the layout thereof. Within a window of control, that is a range of values of output temperature this selection of lengths allows a combination which will satisfy the control window over the very wide range of different conductivities and flow rates to be catered for. As stated an overriding control is provided to ensure that the total current supplied does not exceed a specified limit appropriate to the capacity of the installation.

Figure 5:
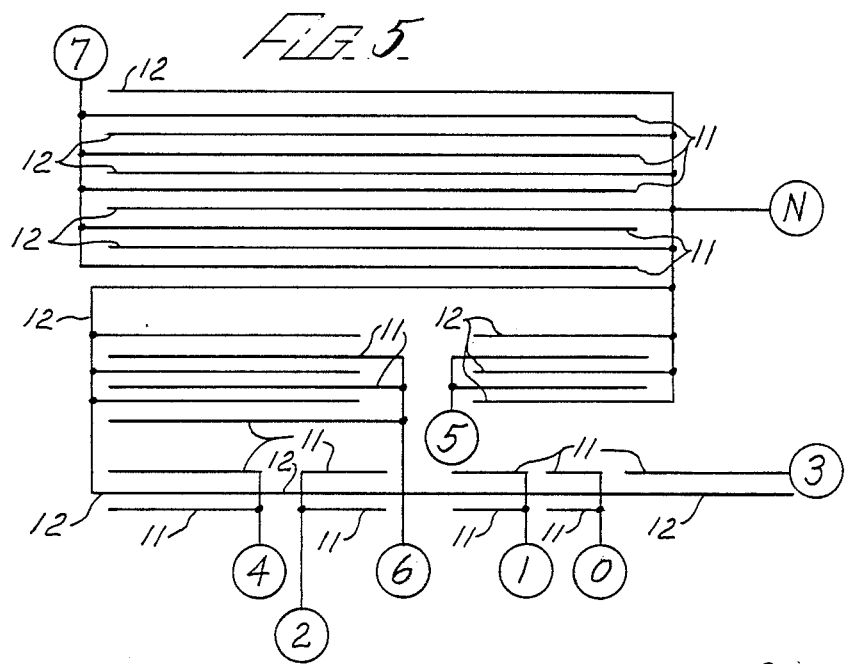
FIG. 5 is an electrical diagram of the heating circuitry showing the significant bit arrangement in an 8 bit example.

FIG. 5 shows the electrical connections and here the same reference numerals are used for the electrodes as were used in FIG. 2. This connection diagram shows how each of the 8 bits are made up by appropriate connections of the electrodes in the heating unit 2. As will be seen all neutral conductors are inter-connected in parallel to the supply. The various live conductors are connected according to their groupings of binary bits to thyristors or triacs to control switching the elements as required. The numbers in the circles are the significant binary bits and the number zero, of course, represents the least significant bit and 7 the most significant bit. During all switching sequences the least significant bit is switched first on or off so that under a control actuation the system climbs or drops to the required total conducting area for any set of conditions through the least significant bit steps of the binary number system. In this arrangement this corresponds to a 12 mm length of the electrode. Standard control theory may be implemented to ensure avoiding current peaks or instabilities in current control.

Figure 6:
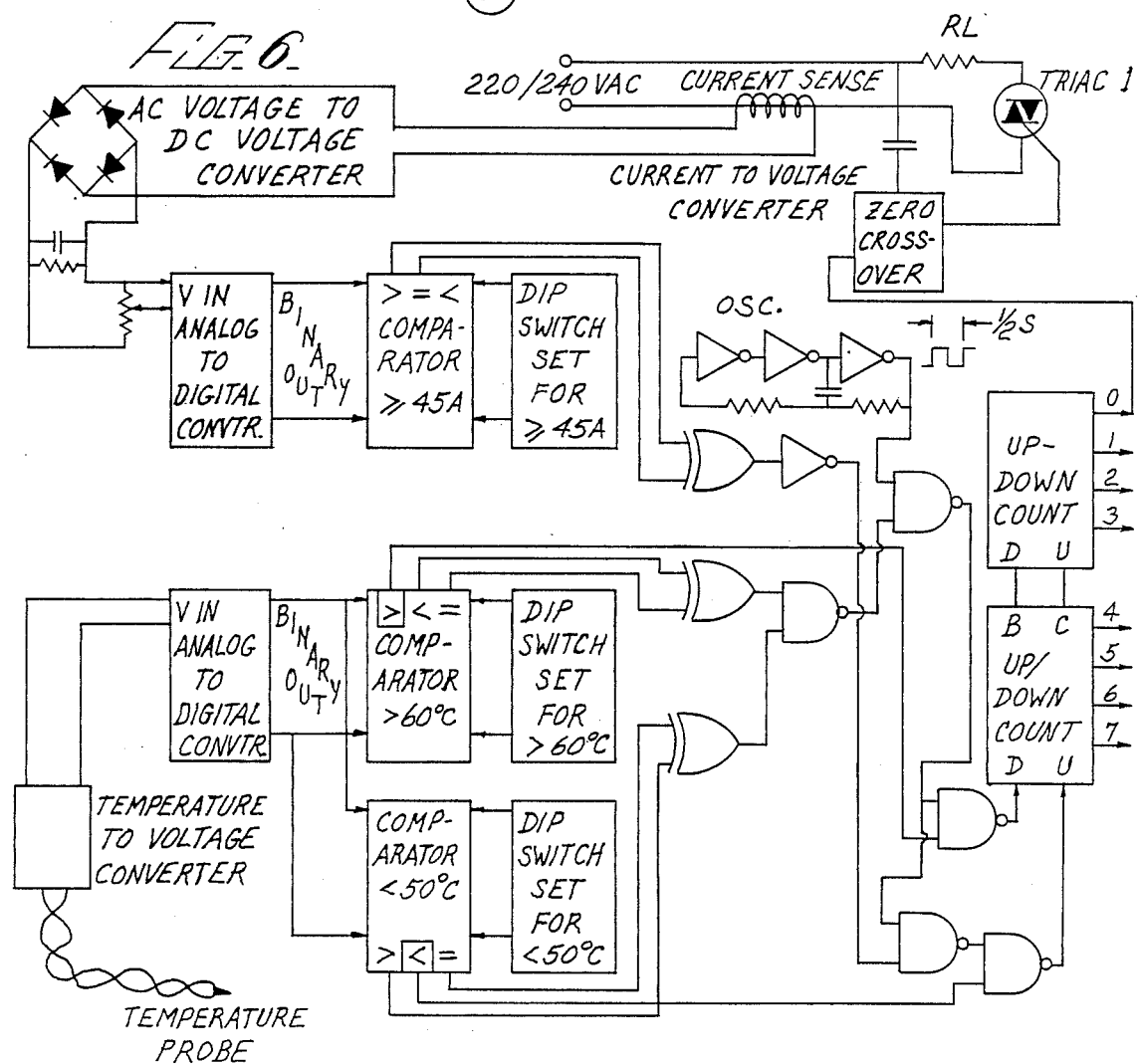
FIG. 6 is an electrical diagram showing a typical switching control circuitry using an 8 bit example.

FIG. 6 shows, for example, in the case of the bit 0 how the live conductors are connected by means a of triac or thyristor, each triac or thyristor having a sufficient current carrying capacity for the sub element it feeds but all of them being controlled in parallel by a single control wire and all of them being supplied with power in parallel. Here the bits 0 through 7 are similarly switched.

The system is designed to monitor in the first place temperature, cut off being at 55° C. The main advantage of this is that during slow flow rates the current drawn can be substantially reduced yet still achieving the required temperature rise from typical ambient temperatures of about 15°–20° C. This also will not allow the actual boiling of water should this system switch on while the tap is closed. Current, however, is in the second place monitored and the influence of this protection is merely to limit the maximum current supply to the system as a whole to 40 amps per phase which is a convenient maximum, for example, for a domestic installation. If a multiple phase system is in use it is moreover designed to simultaneously switch in all three phases segments so as to provide a balanced load at all times, also a matter of considerable importance which is favoured by the electricity supply authorities.

If it is preferred to have a lower maximum current, say 20 amps, the design parameters of the apparatus may be adjusted to achieve this.

It will be observed that in this arrangement the structure is permanent without moving parts and the electrodes are at a constant distance from each other designated by design.

Figure 7:
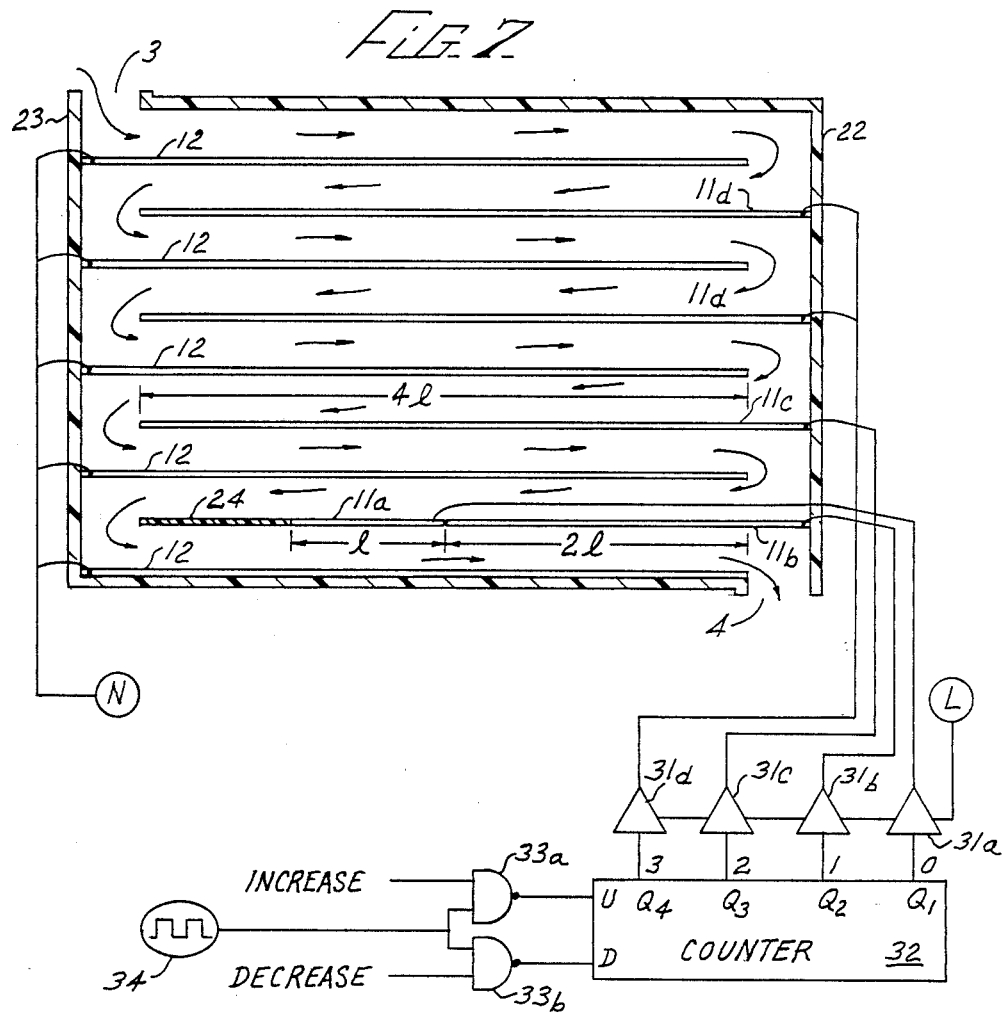
FIG. 7 is a pictorial schematic diagram showing a simplified configuration of the apparatus of FIG. 1, including a portion of the control circuitry of FIG. 6.

FIG. 7 shows a simplified configuration of the unit 2 having four bits of binary control. There are four of the live electrodes 11, designated 11a, 11b, 11c, and 11d in FIG. 7, the electrode 11a having a length l, the electrode 11b having a length 2l, and the electrode 11c having a length 4l. The electrode 11d is segmented, each of the two segments having the length 4l. Thus the total length of the electrodes 11 is 15l. The zig-zag path of the water, from the water inlet 3 to the outlet 4 passes on opposite sides of each of the live electrodes 11 as indicated by the arrows in FIG. 7, five of the neutral conductors 12 forming partitions that are equally spaced from the live electrodes 11 as discussed above. Thus, by virtue of the uniform width of the live electrodes 11 and the neutral electrodes 12, the heating power associated with each of the live electrodes 11 (at a given conductivity of the water) is proportional to its length.

As further shown in FIG. 7, each of the live electrodes 11 is selectively connected to the line power (L) by a counterpart of the triac/zero crossover circuitry of FIG. 6, the counterparts being designated drivers 31a, 31b, 31c, and 31d in FIG. 7. The drivers 31 are connected, respectively, to the counter outputs 0–3 of a 4-bit binary up-down counter 32, the counter 32 corresponding to one of the "up/down count" elements of FIG. 6. The counter 32 is driven from a pair of 2-input NAND gates 33, designated 33a and 33b in FIG. 7, for incrementing or decrementing the counter 32 in response to the temperature and/or current sense circuitry as described above in connection with FIG. 6. In particular, a counterpart of the oscillator of FIG. 6, designated oscillator 34, is connected to respective inputs of the gates 33a and 33b for setting a rate at which the counter 32 is to be incremented or decremented. The other input of the gate 33a, labeled "Increase" is responsive to a state of the comparator circuitry of FIG. 6, indicating a need for increased heating power. Accordingly, the counter is incremented at intervals such as every half second while the "Increase" signal is active. Conversely, the counter 32 is decremented at the same rate while the "Decrease" signal is active (when there is a need for decreased heating power). Thus the unit 2, in response to successive states of the counter 32 causes the water to be heated at rates proportional to successive ones of the integers 0–15, multiplied by the conductivity of the water.

The heating unit 2 should, of course, be water tight and should not allow leakage over, under or around the elements in any circumstances.

The system must be able to withstand a pressure of 120 psi at 65° C.

The system also has a flow restriction at the outlet; this is to limit the flow to a desired rate and to limit aerating to a minimum within the system. This flow restriction may be made adjustable to allow adjustment on installation to suit local available water pressure.

The electrodes may be of carbon.

If exceptionally low conductivity (pure) water gives problems the apparatus may be given a "salting" device at the water inlet to add a substance which will ionise in the water to increase the free ions and thus conductivity of the water.

What is claimed:

1. A water heating apparatus for water having an electrical conductivity, comprising:
   (a) a plurality of electrode pairs immersed in water;
   (b) switching means for selectively connecting one or more of the electrode pairs to a source of electrical power whereby the water is heated by the passage of electrical current therethrough, each of the electrode pairs being configured for transmitting a different magnitude of electrical power into the water relative to the other electrode pairs; and
   (c) transducer means operatively responsive to the electrical current for controlling the switching means.

2. A water heating apparatus as claimed in claim 1, in which the levels of electrical power associated with the electrode pairs are related substantially in proportion to bit values in a multiple bit binary sequence wherein the control of the switching means by the transducer means is effected by digital control circuitry having a multiple bit binary control sequence, the bits of the control sequence corresponding, respectively, to the bit values of the electrode pairs.

3. A water heating apparatus as claimed in claim 1, in which the transducer means comprises means for measuring an output temperature of the water.

4. A water heating apparatus as claimed in claim 3, in which the transducer means comprises means for measuring a total electrode current through the water.

5. A water heating apparatus as claimed in claim 4, in which a window of the measured output temperature is used for control, and in which only an upper limit of heating current is effected by the detection of total electrode current.

6. A water heating apparatus as claimed in claim 1, applied in the context of a demand heater where the heating elements switch on only when water flow through the apparatus commences, in which the switching means comprises suitable solid state circuitry and the apparatus has the advantage of fixed structure with no moving parts.

7. A water heating apparatus as claimed in claim 6, in which at least one of the elements is sub-divided into sub elements electrically connected in parallel to facilitate convenient overall dimensions for the apparatus, the sub-divided element being configured for transmitting a greater magnitude of electrical power than at least one of the other elements.

8. A water heating apparatus as claimed in claim 7, in which the apparatus includes a flat box with all the electrodes mounted in sealing contact between a base and a lid of the box with one electrode of each pair sealed to a first side wall of the box but terminating short of an opposite second side wall and the other electrode of each pair sealed to the second side wall and terminating short of the first side wall so defining a zig-zag path for flow of water to follow through the box from inlet to outlet.

9. A water heating apparatus as claimed in claim 8, in which the electrodes are uniformly spaced, having uniform width, and lengths approximately in the ratio of the binary bit values 128, 64, 32, 16, 8, 4, 2 and 1, enumerated from most significant bit to least significant bit, respectively.

10. A water heating apparatus as claimed in claim 1, in which earth screens are used at the inlets and outlets to the apparatus for protection against earth leakages and/or neutral connection failures and in which lengths of nonconducting hose connect between the inlet and outlet of the apparatus to external couplings.

* * * * *